US008044362B2

(12) United States Patent
Goo et al.

(10) Patent No.: US 8,044,362 B2
(45) Date of Patent: Oct. 25, 2011

(54) ARRAY SUBSTRATE FOR X-RAY DETECTOR, METHOD OF MANUFACTURING THE SAME, X-RAY DETECTOR HAVING THE SAME INSTALLED THEREIN, AND METHOD OF MANUFACTURING X-RAY DETECTOR

(75) Inventors: Kyung-Sang Goo, Hwaseong-si (KR); Dae-Ho Choo, Yongin-si (KR); Kwan-Wook Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 488 days.

(21) Appl. No.: 12/245,194

(22) Filed: Oct. 3, 2008

(65) Prior Publication Data

US 2009/0095914 A1   Apr. 16, 2009

(30) Foreign Application Priority Data

Oct. 4, 2007  (KR) .................. 10-2007-0099814

(51) Int. Cl.
*H01L 27/146* (2006.01)
*G01T 1/20* (2006.01)
(52) U.S. Cl. .................... 250/370.09; 250/370.11
(58) Field of Classification Search .......... 250/370.09, 250/370.11
See application file for complete search history.

(56) References Cited

U.S. PATENT DOCUMENTS

| 5,912,465 | A | 6/1999 | Kobayashi et al. |
| 7,223,980 | B2 * | 5/2007 | Tanaka et al. ............ 250/370.09 |
| 7,834,321 | B2 * | 11/2010 | Yorkston et al. ......... 250/370.09 |
| 2006/0124932 | A1 * | 6/2006 | Joo et al. ..................... 257/59 |
| 2007/0121035 | A1 * | 5/2007 | Lee et al. ..................... 349/113 |
| 2008/0042228 | A1 * | 2/2008 | Han ............................ 257/432 |

FOREIGN PATENT DOCUMENTS

| JP | 09153606 | 6/1997 |
| JP | 2001320035 | 11/2001 |
| JP | 2003255051 | 9/2003 |

* cited by examiner

*Primary Examiner* — Constantine Hannaher
*Assistant Examiner* — Mindy Vu
(74) *Attorney, Agent, or Firm* — Cantor Colburn LLP (57) ABSTRACT

An x-ray detector including an array substrate including blocks extending along the array substrate in a first direction. Each of the blocks includes cells that are each associated with a data line extending in parallel with the first direction and a gate line extending perpendicularly to the first direction such that the data line crosses the gate line, a thin film transistor respectively connected to the gate and data lines, and a photodiode connected to the thin film transistor to receive light. The cells store charges corresponding to an amount of the light. Gate drivers are connected to ends of the gate lines to select rows of the cells associated with each of the gate lines. Read-out circuits are connected to ends of the data lines to read out charges stored in the cells, of each of the selected rows, that are respectively associated with each of the data lines.

16 Claims, 7 Drawing Sheets

ARRAY SUBSTRATE FOR X-RAY DETECTOR, METHOD OF MANUFACTURING THE SAME, X-RAY DETECTOR HAVING THE SAME INSTALLED THEREIN, AND METHOD OF MANUFACTURING X-RAY DETECTOR

CROSS-REFERENCE TO RELATED APPLICATION

This application claims priority to Korean Patent Application No. 2007-99814, filed on Oct. 4, 2007, and all the benefits accruing therefrom under 35 U.S.C. §119, the contents of which in its entirety are herein incorporated by reference.

BACKGROUND OF THE INVENTION

1. Field of the Invention

Aspects of the present invention relate to an array substrate for an x-ray detector and an x-ray detector having the array substrate installed therein and, more particularly, aspects of the present invention relate to an array substrate for an x-ray detector that is capable of reducing a manufacturing cost thereof and of improving an image display quality thereof, a method of manufacturing the array substrate, an x-ray detector having the array substrate installed therein, and a method of manufacturing the x-ray detector.

2. Description of the Related Art

Recently, in order to process medical image information for medical appliances, a digital radiograph (DR) has been widely accepted. The DR may be classified into a charge-coupled device (CCD) DR, a complementary metal-oxide semiconductor (CMOS) DR, and/or a flat panel (FP) DR in accordance with a kind of sensor, which is installed therein, that converts green light emitted from a scintillator.

The CCD DR and CMOS DR operate by scaling up medical image information when displaying the medical image information. This scaling up of medical image information accounts for the fact that, in general, sizes of the sensors installed therein are relatively small. As a result, a projection DR, such as the above-mentioned CCD and CMOS DRs, may have defects that affect its image processing processes. These defects may result in relatively low quality images in terms of resolution, brightness, and contrast ratio, etc.

Figure 1:
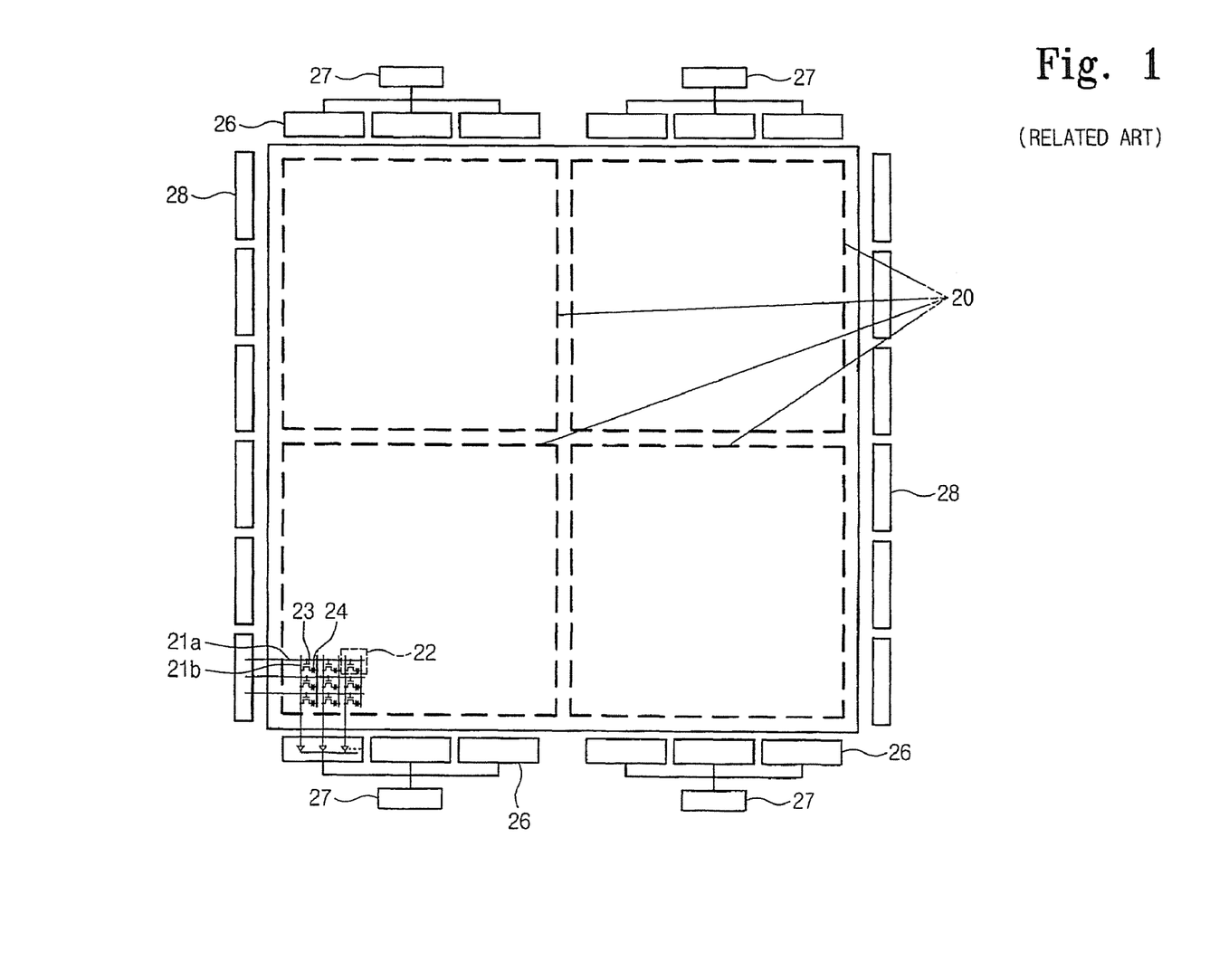
FIG. 1 is a plan view showing an exemplary conventional flat panel x-ray detector.

In detail, the FP DR displays superior x-ray images by using a photoelectric sensor. That is, the flat panel x-ray detecting (FPXD) device is one of the most advanced x-ray detecting device of all of the various DRs. FIG. 1 is a plan view showing a conventional flat panel x-ray detector 30. As shown in FIG. 1, the x-ray detector 30 may produce photographic images of objects having various vertical and horizontal sizes. The x-ray detector 30 includes an array substrate having a tile-like structure. Here, four array substrates 20 are combined with each other.

Referring to FIG. 1, the array substrates 20 of the x-ray detector 30 each include thin film transistor (TFT) arrays that are each arranged in rows and columns, read out circuits 26 that are connected to the TFT arrays, gate drivers 28, and analog-to-digital converters 27. Each TFT array includes cells 22, and each cell 22 includes a thin film transistor 23 and a p-i-n (PIN) photodiode 24. The PIN photodiode 24 includes a conductive layer and two electrodes that each respectively applies a voltage to both sides of the conductive layer. The conductive layer includes a p-type photoconductive layer into which p-type impurities are doped, a photoconductive layer into which impurities are not doped, and an n-type photoconductive layer into which n-type impurities are doped. A scintillator is formed on the PIN photodiode 24.

In conventional appliances, however, image quality of the image information obtained through the x-ray detector 30 may be decreased by various factors, such as a uniformity, or lack thereof, of lines 21a and 21b arranged on the array substrates 20, uniformity, or lack thereof, and defects of the photodiode 24, and leakage current levels, etc. Accordingly, in order to prevent a decrease in the image quality, an image correction operation is performed so as to adjust an offset voltage level of the gate and data lines 21a and 21b.

Where the x-ray detector 30, including the array substrate of which four array substrates 20 are combined with each other (i.e., in a tile-like structure), is applied to take the photograph of the image, however, the offset correction may be imprecisely performed since the gate and data lines 21a and 21b may be separated from each other in accordance with the arrangements of the array substrates 20. Further, defects of the array substrates 20 may actually increase since external integrated circuits may be respectively bonded to every array substrate 20.

BRIEF SUMMARY OF THE INVENTION

An aspect of the present invention provides an array substrate for an x-ray detector capable of improving yield and reducing a manufacturing cost thereof.

An aspect of the present invention also provides an x-ray detector having the array substrate installed therein.

An aspect of the present invention also provides a method of manufacturing the array substrate for the x-ray detector.

An aspect of the present invention also provides a method of manufacturing the x-ray detector.

In one aspect of the present invention, an array substrate for an x-ray detector is provided and includes a plurality of cells to store charges respectively corresponding to an amount of received light, and a light blocking layer to cover dummy pixels of the cells, the light blocking layer being arranged in a peripheral area of the x-ray detector so as to be positioned to block light advancing toward the dummy pixels, wherein each cell includes a gate line extending along the array substrate in a predetermined direction, a data line crossing the gate line to define a pixel area, a thin film transistor respectively connected to the gate and the data lines, and a photodiode connected to the thin film transistor to receive the light as having been converted from an x-ray.

The light blocking layer may include a carbon-containing organic material that is configured to be patterned by exposure to a light.

In another aspect of the present invention, an x-ray detector is provided and includes an array substrate including a plurality of blocks extending along the array substrate in a first direction, each of the blocks including a plurality of cells that are each associated with a data line extending substantially in parallel with the first direction and a gate line extending substantially perpendicularly with respect to the first direction such that the data line crosses the gate line at a location of the cell, a thin film transistor respectively connected to the gate and data lines, and a photodiode connected to the thin film transistor to receive light converted from x-rays, the cells storing charges corresponding to an amount of the light, a plurality of gate drivers arranged adjacent to a first side of the array substrate and connected to ends of the gate lines to select rows of the cells associated with each of the gate lines through a scanning operation, and a plurality of read-out circuits arranged adjacent to a second side of the array substrate and connected to ends of the data lines to read out charges stored in the cells, of each of the selected rows, that are respectively associated with each of the data lines to which each of the read-out circuits are respectively connected.

The x-ray detector may further include a plurality of analog-to-digital converters that each convert analog signals substantially simultaneously applied from the each of the read-out circuits into digital signals, the analog-to-digital converters being arranged adjacent to the read-out circuits along the second side of the array substrate in numbers that correspond to a number of the blocks in one-to-one fashion.

In another aspect of the present invention, a method of manufacturing an array substrate for an x-ray detector is provided and includes forming a plurality of cells to each receive light converted from x-rays and to each store charges corresponding to an amount of the light, and forming a light blocking layer covering dummy pixels of the cells in a peripheral area to block light advancing toward the dummy pixels, wherein the forming of each of the cells includes forming a gate line extending in a predetermined direction, a data line crossing the gate line to define a pixel area, and a thin film transistor connected to the gate and data lines; and forming a photodiode connected to the thin film transistor to receive the light.

In another aspect of the present invention, a method of manufacturing an x-ray detector is provided and includes forming an array substrate including a plurality of blocks extending along the array substrate in a first direction, each of the blocks including a plurality of cells that are each associated with a data line extending substantially in parallel with the first direction and a gate line extending substantially perpendicularly with respect to the first direction such that the data line crosses the gate line at a location of the cell, a thin film transistor respectively connected to the gate and data lines, and a photodiode connected to the thin film transistor to receive light converted from x-rays, the cells storing charges corresponding to an amount of the light, forming a plurality of gate drivers at respective positions adjacent to a first side of the array substrate, each of the gate drivers being connected to ends of the gate lines to select rows of the cells associated with each of the gate lines through a scanning operation, and forming a plurality of read-out circuits at respective positions adjacent to a second side of the array substrate, each of the read-out circuits being connected to ends of the data lines to read out charges stored in the cells of each of the selected rows that are respectively associated with each of the data lines to which each of the read-out circuits are respectively connected.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
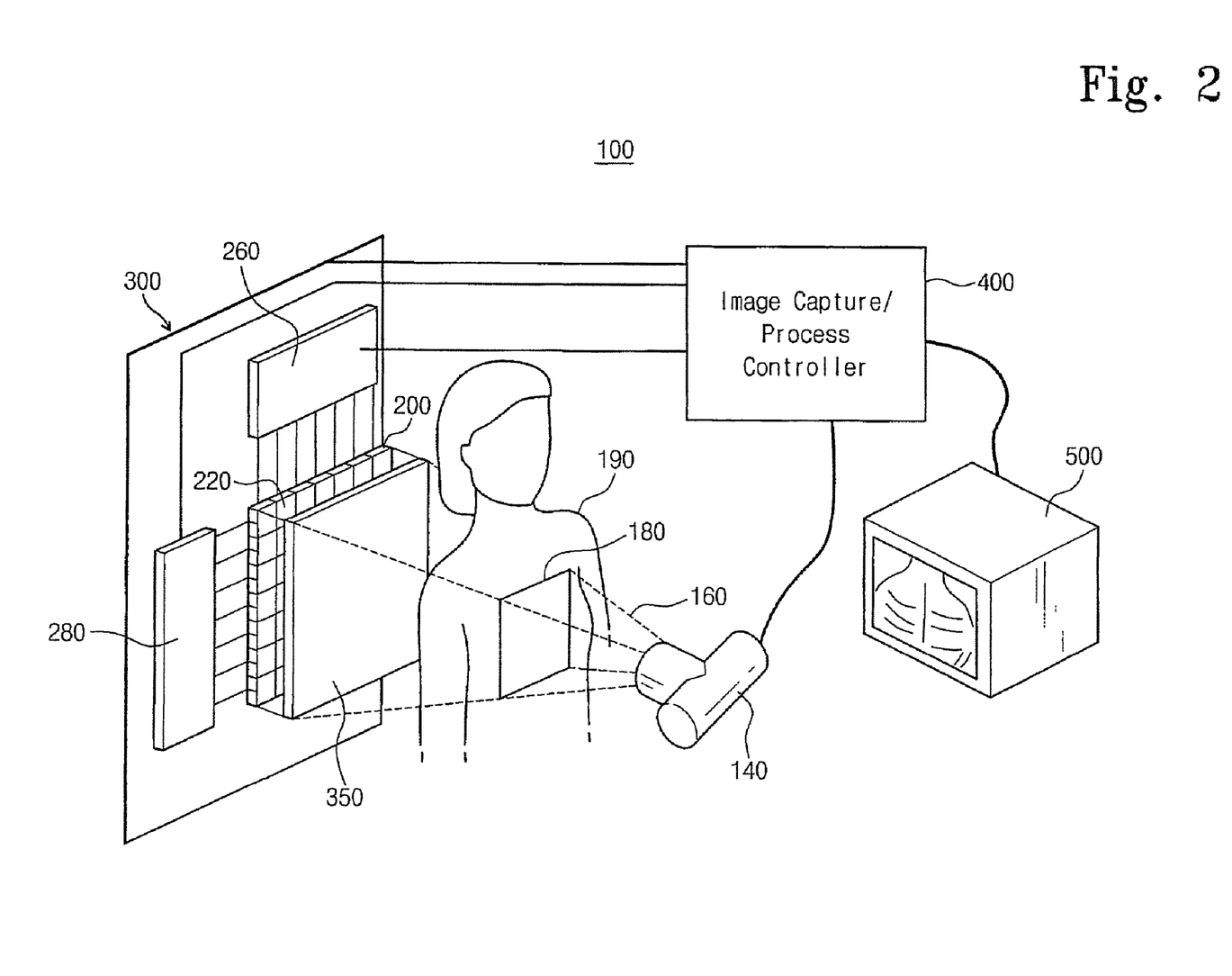
FIG. 2 is a view showing an exemplary x-ray system having a flat panel x-ray detector according to the present invention.

FIG. 2 is a view showing an exemplary x-ray system 100 having a flat panel x-ray detector 300 according to the present invention.

As shown in FIG. 2, the exemplary x-ray system 100 includes an x-ray generator 140 to irradiate x-rays 160 onto a predetermined area 180 of a patient's body 190, the x-ray detector 300 to detect the x-rays 160, an image capture/process controller 400 to capture an x-ray image and to process the captured x-ray image, and a display device 500 to display the x-ray image captured by the image capture/process controller 400.

In the x-ray system 100, the x-rays 160 are transmitted through the predetermined area 180 of the patient's body 190. The x-ray detector 300 provides the x-ray image with a light intensity that corresponds to an amount of the x-rays 160 irradiated onto and through the patient's body 190, and the image capture/process controller 400 captures and processes the x-ray image provided by the x-ray detector 300. Then, the display device 500 displays the x-ray image in real time. In the present exemplary embodiment, the display device 500 may include a flat panel ("FP") display that may display the x-ray image data in a digital format, such as a liquid crystal display ("LCD").

As shown in FIG. 2, the x-ray detector 300 includes an array substrate 200 having a plurality of arrays 220 defined therein. Gate drivers 280 are arranged alongside a first side of the array substrate 200. Read-out circuits 260 are arranged alongside a second side of the array substrate 200. The x-ray detector 300 further includes a scintillator layer 350 that is disposed on the array substrate 200. The scintillator layer 350 converts the x-rays 160, which are transmitted through the patient's body 190, into visible light and provides the visible light to the array substrate 200.

Figure 3:
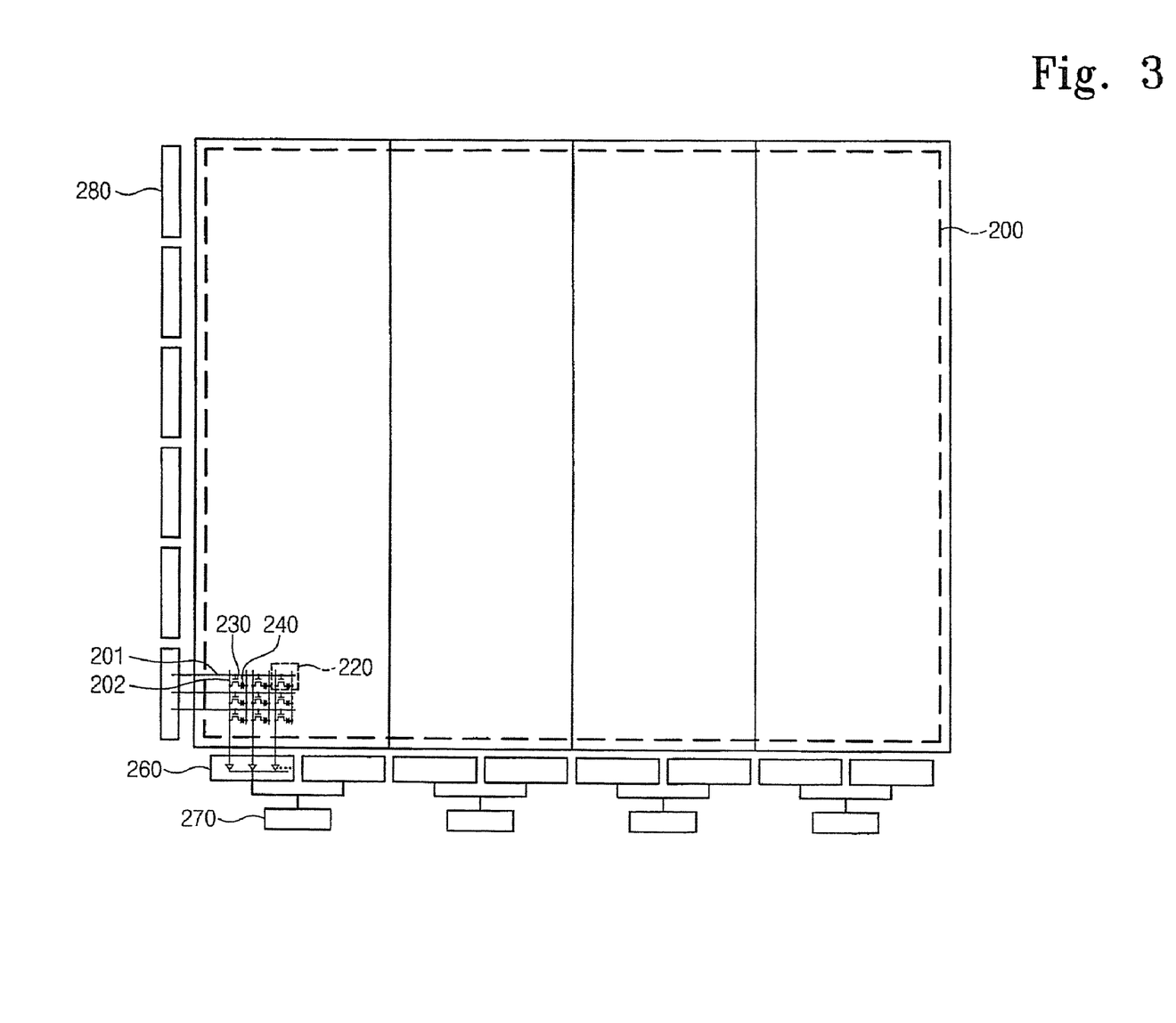
FIG. 3 is a plan view showing an exemplary embodiment of an x-ray detector of FIG. 2.
Figure 4:
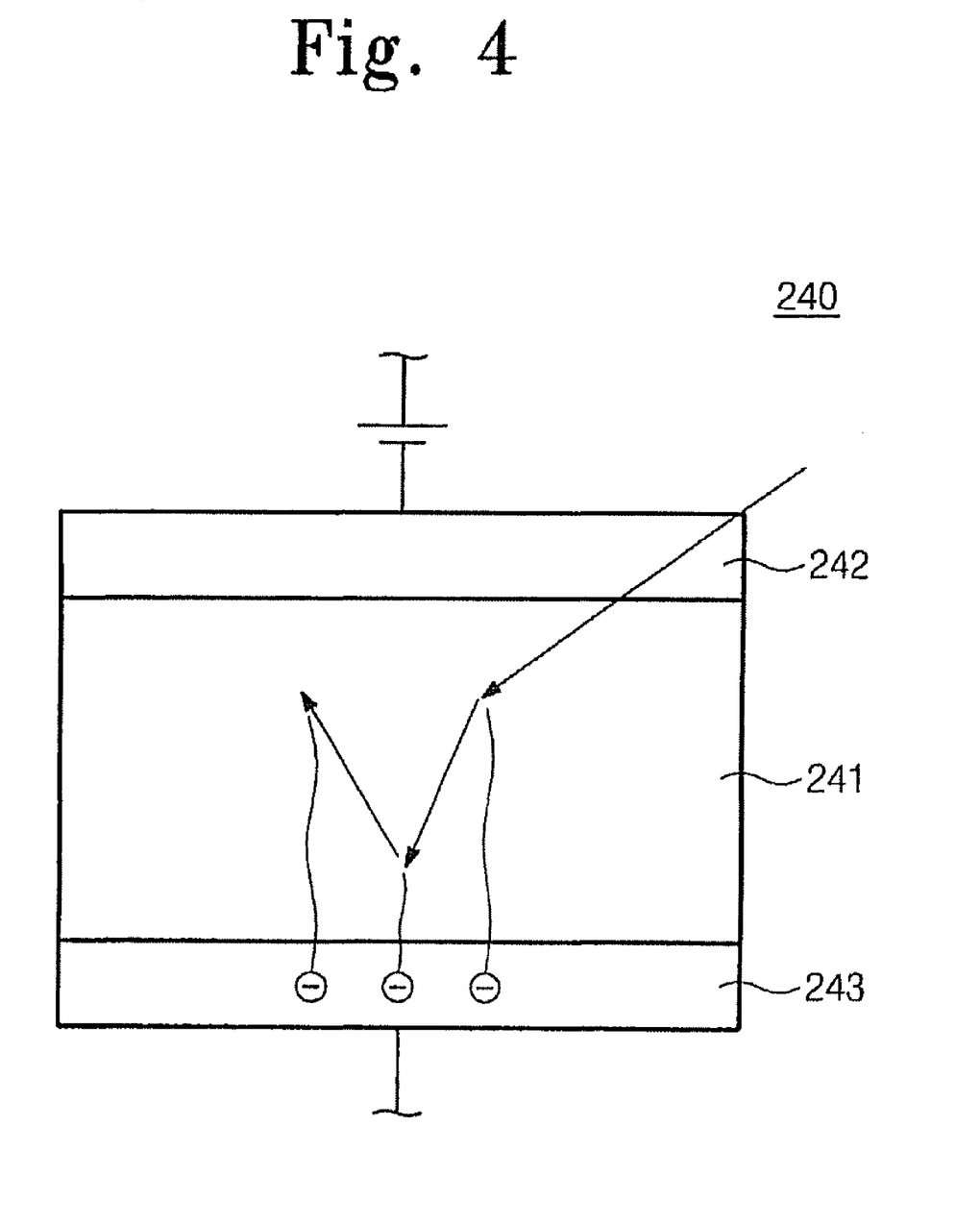
FIG. 4 is a sectional view showing an exemplary PIN junction diode of FIG. 3.

FIG. 3 is a plan view showing an exemplary embodiment of the x-ray detector 300 of FIG. 2, and FIG. 4 is a sectional view showing an exemplary PIN junction diode 240 of FIG. 3.

Referring to FIG. 3, the array substrate 200 of the x-ray detector 300 may comprise a single array substrate. In other words, the array substrate 200 of the present invention does not have a tile-like structure and may have a single array structure to which one original glass substrate is applied.

The array substrate 200 includes a plurality of cells 220 that are defined therein in a pattern. In an exemplary embodiment of the invention, the pattern may comprise a matrix of cells. The array substrate 200 may also be divided into four blocks with each block extending in a direction that is substantially parallel to a longitudinal direction of data lines 202. Of course, it is understood that, even where the array substrate 200 is divided into blocks, the array substrate 200 remains a singular feature. Moreover, it is further understood that the array substrate 200 may be arranged in other formats in accordance with other embodiments of the invention.

The read-out circuits 260 are arranged at positions alongside and/or adjacent to a second side of the array substrate 200 and are electrically connected to the cells 220. The gate drivers 280 are arranged at positions such that the gate drivers 280 are alongside and/or adjacent to a first side of the array substrate 200. Here, the gate drivers 280 are also electrically connected to the cells 220. The x-ray detector 300 includes analog-to-digital converters 270 each of which is electrically connected to a corresponding individual read-out circuit 260 of the read-out circuits 260. In an embodiment of the present embodiment, the gate drivers 280 and the read-out circuits 260 may each include a plurality of integrated circuits (IC) or chips. That is, the analog-to-digital converters 270 may include four chips that each correspond to a single one of the four blocks of the array substrate 200, and each chip may be electrically connected to one or more other chips that together constitute the read-out circuits 260.

Each of the cells 220 includes a thin film transistor 230, a PIN junction diode 240, a corresponding individual gate line 201 from among a group of gate lines 201, and a corresponding data line 202 from among a group of data lines 202. The PIN junction diode 240 receives visible light (e.g., green light) that is obtained as a result of the conversion of the x-rays 160 via the scintillator 350 after the x-rays 160 are emitted from the x-ray generator 140 and, subsequently, transmitted through the patient's body 190.

As shown in FIG. 4, the PIN junction diode 240 includes an intrinsic silicon layer 241, a p-type silicon layer 242, and an n-type silicon layer 243. The n-type silicon layer 243 faces the p-type silicon layer 242 with the intrinsic silicon layer 241 interposed between the p-type silicon layer 242 and the n-type silicon layer 243. When visible light is incident onto the intrinsic silicon layer 241, silicon (Si) in the intrinsic silicon layer 241 is dissociated and converted into electrical charges (e.g., electron-hole pairs). While the intrinsic silicon layer 241 is in the Si dissociated state, a negative voltage of about 5 to 7 volts is applied to the p-type silicon layer 242, so that electrons (negative charges) move to the n-type silicon layer 243. The electrons that are moved to the n-type silicon layer 243 are stored in a source layer of the thin film transistor 230, which is formed on the array substrate 200. When the thin film transistor 230 is turned on in response to a gate signal that is applied through the corresponding individual gate line 201 from among the group of the gate lines 201, the stored charges are read out to the data lines 202 and stored in the read-out circuits 260.

Referring to FIG. 3, signals that are read out from the pixels are stored in analog form in accordance with a photocurrent thereof. The read-out analog signals are different from each other in accordance with an amount of light that is applied to each pixel. The analog signals, which are different from each other in quantity, are then converted into digital signals by the analog-to-digital converters 270. The digital signals are then displayed as digital images on the display 500. In general, when reading out photoelectric signals that are converted via the read-out circuits 260, the photoelectric signals corresponding to one gate line 201 are substantially simultaneously read out by the read-out circuits 260, and the photoelectric signals corresponding to the number of channels of each of the read-out circuits 260 are sequentially applied to the analog-to-digital converters 270 through a multiplexer (MUX). As a result, the read-out time of the read-out circuits 260 is relatively lengthened.

Accordingly, as shown in FIG. 3, in an embodiment of the present invention, the data lines 202 are divided into groups of data lines 202 with the groups of data lines 202 corresponding to the four blocks of the array substrate 200. The photoelectric signals of the cells 220 connected to the corresponding gate line 201 are substantially simultaneously read out by all of the read-out circuits 260 that are arranged alongside and/or adjacent to the array substrate 200. The read-out photoelectric signals are then simultaneously applied to the analog-to-digital converters 270, which are connected to the corresponding read-out circuits 260. Thus, since the number of the analog-to-digital converters 270 corresponds to the number of the groups of the data lines 202, the number of the gate drivers 280 and the number of the read-out circuits 260 of the x-ray detector 300 may be reduced. As a result, the read-out time may be prevented from being relatively lengthened, thereby reducing a manufacturing cost of the x-ray detector 300.

Image quality of the x-ray image obtained through the x-ray detector 300 having the above-mentioned structure and function depends on various factors. These factors may include a relative uniformity of the manners in which the gate and data lines 201 and 202, respectively, are arranged on the array substrate 200, relative uniformities, type and quantity of defects of the PIN junction diode 240, and leakage current levels, etc.

Figure 5:
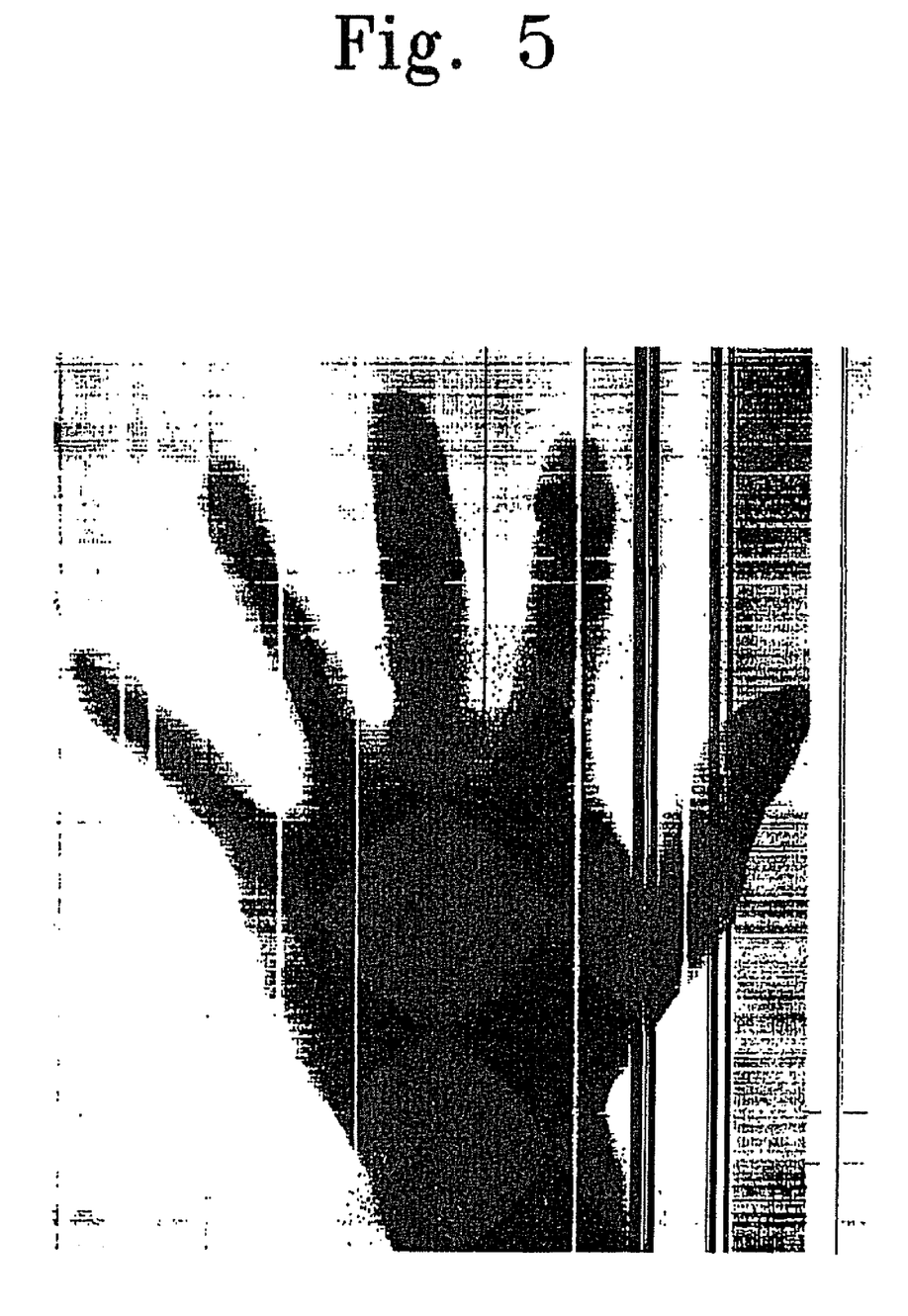
FIG. 5 is a photograph diagram showing an exemplary conventional x-ray image of which an image offset correction with respect to gate and data lines are not performed.
Figure 6:
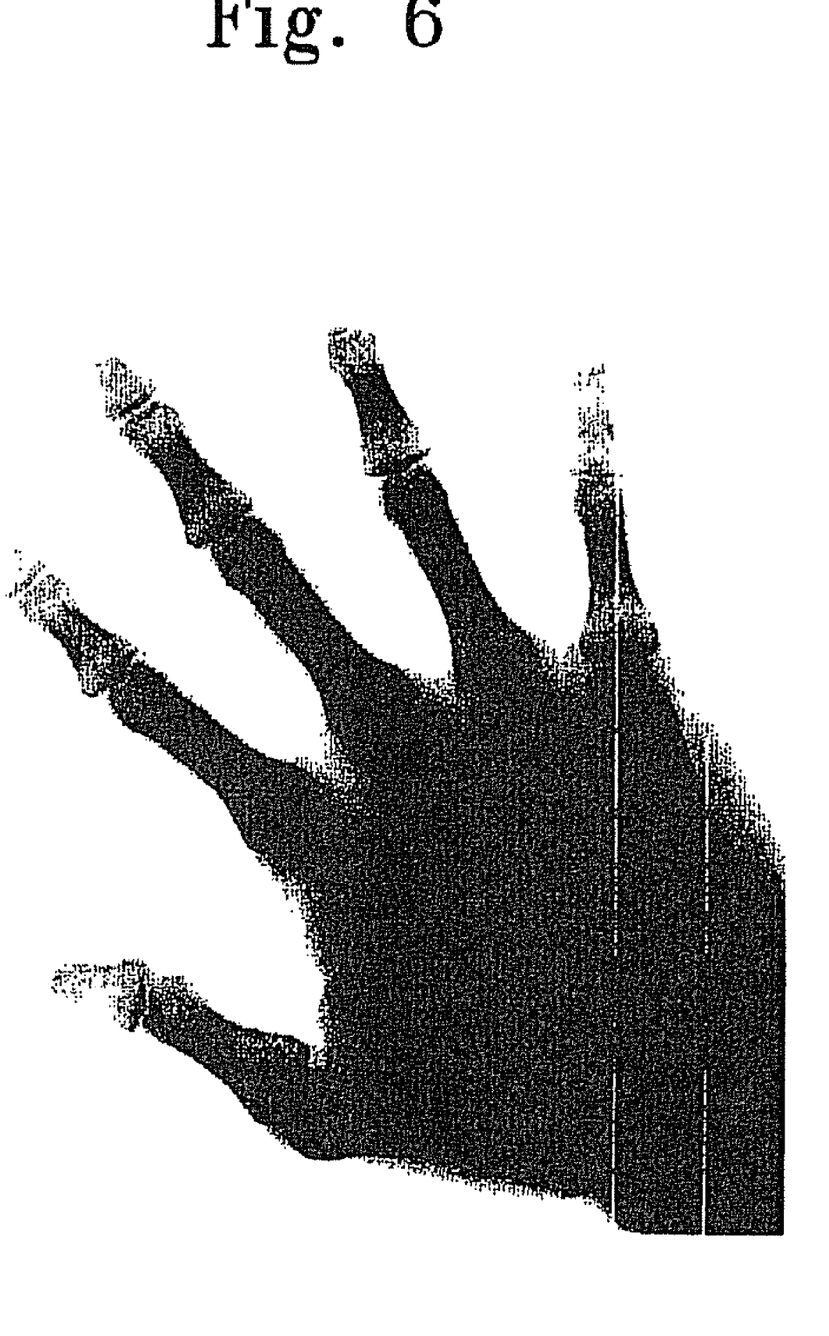
FIG. 6 is a photograph diagram showing an exemplary x-ray image of which an image offset correction with respect to gate and data lines are performed according to the present invention.

FIG. 5 is an exemplary photographic diagram showing a conventional x-ray image of which an image offset correction with respect to gate and data lines are not performed, and FIG. 6 is an exemplary photographic diagram showing an x-ray image of which an image offset correction with respect to gate and data lines 201 and 202, respectively, are performed in accordance with an embodiment of the present invention.

As shown in FIG. 5, in a conventional x-ray image, horizontal and vertical lines appear on the x-ray image due to image offset voltage differences between gate lines 201 and due to image offset voltage differences between data lines 202.

According to a conventional method of gain and offset correction, which may be employed in accordance with the manufacturing of a display panel, the image offset voltage levels of respective lines (e.g., gate and data lines 201 and 202, respectively) are set. The setting of the image offset voltage levels may be accomplished as a result of a comparison of dark image data that is obtained when the x-rays are not applied to the display panel with image data that is obtained when the x-rays are applied to the display panel. However, since the method of gain and offset correction may be varied in accordance with varied characteristics of amorphous silicon thin film transistors (a-Si TFT) for the duration of the use of the display panel, an improper x-ray image may be captured, as shown in FIG. 5, where the method of gain and offset correction is not applied to the display panel.

As shown in FIG. 6, however, when the method of gain and offset correction is performed in real time, the horizontal and vertical lines, as shown in FIG. 5, may be reduced or substantially prevented from appearing on the display panel. Such prevention may thereby improve image quality of the x-ray image.

Figure 7:
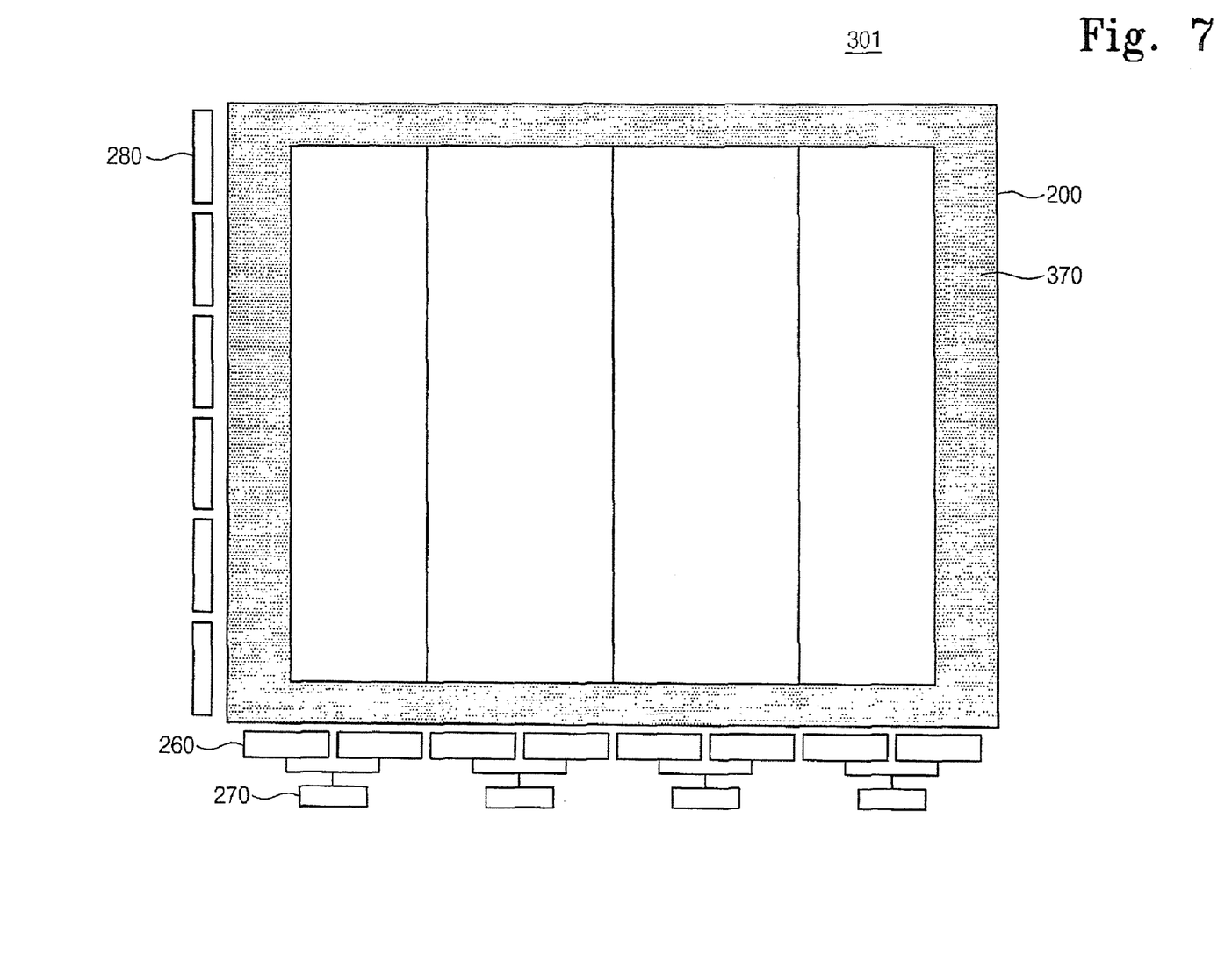
FIG. 7 is a plan view showing another exemplary embodiment of an x-ray detector according to the present invention.

FIG. 7 is a plan view showing another exemplary embodiment of an x-ray detector in accordance with the present invention. In FIG. 7, the same reference numerals denote the same elements in FIG. 3. Thus, detailed descriptions of the same elements will be omitted.

Referring to FIG. 7, an x-ray detector 301 may include a light blocking layer 370 in order to perform the method of gain and offset correction in real time. The light blocking layer 370 comprises a carbon-containing organic material that is configured to be patterned by exposure to light. Also, the x-ray detector 301 may further include dummy pixels (not shown) having substantially similar structures as those of the cells 220 with the dummy pixels being arranged under the light blocking layer 370. The light blocking layer 370 has a closed-loop shape and is arranged along an outermost area of the x-ray detector 301 to surround the cells 220. The light blocking layer 370 blocks light advancing toward the PIN junction diode 240 (see FIG. 3) that is arranged in the dummy pixels. Thus, the x-ray image detected by the x-ray detector 301 is corrected with reference to the read-out signals through the dummy pixels. Particularly, offset voltage differences caused by electrical characteristics of the gate and data lines 201 and 202, respectively, are measured based on differences between signals that are detected at both ends of the dummy pixels arranged under the light blocking layer 370. Accordingly, the offset voltage levels may be corrected by the offset voltage differences, so that the image quality of the x-ray image may be relatively improved.

Also, since the thin film transistors 230 (see, FIG. 3) that are arranged on the array substrate 200 include a material made of a semiconductor, it is possible that characteristics of the transistors 230 may be varied in accordance with temperature variations. Thus, where signals are fed back whenever the temperature varies, the offset voltage levels are corrected by the variation in characteristics of the thin film transistor 230 due to the temperature variation.

In accordance with an embodiment of the present embodiment, the light blocking layer 370 may comprise a black resin that is non-transparent or another similar material that is similarly non-transparent.

Accordingly, the x-ray detectors 300 and 301, as described above, include the data lines 202 that are divided into the groups of data lines 202. Further, each of the x-ray detectors 300 and 301 includes analog-to-digital converters 270 that each correspond to each of the groups of data lines 202 in one-to-one fashion. Thus, the read-out signals from the data lines 202 are substantially simultaneously transmitted to the corresponding analog-to-digital converter 270 of the analog-to-digital converters 270. As a result, a number of the read-out circuits 260 are substantially reduced along with associated manufacturing costs. Moreover, a read-out time is substantially prevented from being relatively lengthened.

In an embodiment of the invention, the x-ray detector 301 may further include the light blocking layer 370 formed on the outermost area of the array substrate 200 and the dummy pixels formed under the light blocking layer 370, so that the method of gain and offset correction may be performed in real time, to thereby improve the image quality of the x-ray image detected by the x-ray detector 300.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An x-ray detector comprising:
an array substrate comprising:
a plurality of blocks which extend along the array substrate in a first direction, each of the blocks including a plurality of cells that are each associated with a data line extending substantially in parallel with the first direction and a gate line extending substantially perpendicularly with respect to the first direction such that the data line crosses the gate line at a location of the cell, a thin film transistor respectively connected to the gate and data lines, and a photodiode, connected to the thin film transistor, which receives light converted from x-rays, the cells storing charges corresponding to an amount of the light;
a plurality of gate drivers, arranged adjacent to a first side of the array substrate and connected to ends of the gate lines, which select rows of the cells associated with each of the gate lines through a scanning operation; and
a plurality of read-out circuits, arranged adjacent to a second side of the array substrate and directly connected to ends of the data lines extending directly from the plurality of blocks, which read out charges stored in the cells, of each of the selected rows, that are respectively associated with each of the data lines extending directly from the plurality of blocks to which each of the read-out circuits are respectively directly connected.

2. The x-ray detector according to claim 1, further comprising a plurality of analog-to-digital converters which each convert analog signals substantially simultaneously applied from the each of the read-out circuits into digital signals, the analog-to-digital converters being arranged adjacent to the read-out circuits along the second side of the array substrate in numbers that correspond to a number of the blocks in one-to-one fashion.

3. The x-ray detector according to claim 2, wherein each of the read-out circuits comprises a plurality of chips, and wherein each of the analog-to-digital converters is electrically connected to at least one corresponding one of the chips.

4. The x-ray detector according to claim 1, wherein the photodiode comprises:
a lower electrode connected to the thin film transistor;
a photoconductive layer formed on the lower electrode; and
an upper electrode formed on the photoconductive layer.

5. The x-ray detector according to claim 1, further comprising a scintillator, arranged on the array substrate, which converts the x-rays into the light and to apply the light to the array substrate.

6. The x-ray detector according to claim 1, further comprising a light blocking layer comprising a black matrix material to cover a peripheral area of the array substrate.

7. The x-ray detector according to claim 6, further comprising dummy pixels arranged under the light blocking layer, wherein light advancing toward the dummy pixels is blocked by the light blocking layer, such that black reference data is output from the dummy pixels.

8. The x-ray detector according to claim 6, wherein the black matrix material comprises a carbon-containing organic material that is configured to be patterned by exposure to a light.

9. A method of manufacturing an x-ray detector, comprising:
forming an array substrate comprising:
a plurality of blocks which extend along the array substrate in a first direction, each of the blocks including a plurality of cells that are each associated with a data line extending substantially in parallel with the first direction and a gate line extending substantially perpendicularly with respect to the first direction such that the data line crosses the gate line at a location of the cell, a thin film transistor respectively connected to the gate and data lines, and a photodiode connected to the thin film transistor to receive light converted from x-rays, the cells storing charges corresponding to an amount of the light;
forming a plurality of gate drivers at respective positions adjacent to a first side of the array substrate, each of the gate drivers being connected to ends of the gate lines to select rows of the cells associated with each of the gate lines through a scanning operation; and
forming a plurality of read-out circuits at respective positions adjacent to a second side of the array substrate, each of the read-out circuits being directly connected to ends of the data lines extending directly from the plurality of blocks to read out charges stored in the cells of each of the selected rows that are respectively associated with each of the data lines extending directly from the plurality of blocks to which each of the read-out circuits are respectively directly connected.

10. The method according to claim 9, further comprising positioning a plurality of analog-to-digital converters that convert analog signals applied from each of the read-out circuits into digital signals, the analog-to-digital converters being arranged adjacent to the read-out circuits on the second side of the array substrate in numbers that correspond to a number of the blocks in one-to-one fashion.

11. The method according to claim 10, wherein each of the read-out circuits comprises a plurality of chips, and wherein each of the analog-to-digital converters is electrically connected to at least one corresponding one of the chips.

12. The method according to claim 9, further comprising arranging a scintillator on the array substrate to convert the x-rays into the light and to apply the light to the array substrate.

13. The method according to claim 9, wherein the forming of the array substrate comprises forming a light blocking layer that comprises a black matrix material to cover a peripheral area of the array substrate.

14. The method according to claim 13, further comprising arranging dummy pixels under the light blocking layer, wherein light advancing toward the dummy pixels is blocked by the light blocking layer, such that black reference data is output from the dummy pixels.

15. The method according to claim 13, wherein the black matrix material comprises a carbon-containing organic material that is configured to be patterned by exposure to a light.

16. The method according to claim 9, wherein the forming of the photodiode comprises:
forming a lower electrode connected to the thin film transistor;
forming a photoconductive layer on the lower electrode; and
forming an upper electrode on the photoconductive layer.

* * * * *